(12) United States Patent
Rudmann et al.

(10) Patent No.: US 9,164,358 B2
(45) Date of Patent: Oct. 20, 2015

(54) MICRO-OPTICAL SYSTEM AND METHOD OF MANUFACTURE THEREOF

(71) Applicant: Heptagon Micro Optics Pte. Ltd., Singapore (SG)

(72) Inventors: Hartmut Rudmann, Jona (CH); Michel Barge, Aeugst-am-Albis (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 187 days.

(21) Appl. No.: 13/644,682

(22) Filed: Oct. 4, 2012

(65) Prior Publication Data

US 2013/0088845 A1   Apr. 11, 2013

Related U.S. Application Data

(60) Provisional application No. 61/543,490, filed on Oct. 5, 2011.

(51) Int. Cl.
*G03B 15/02* (2006.01)
*F21V 8/00* (2006.01)
*B29D 11/00* (2006.01)
(Continued)

(52) U.S. Cl.
CPC .......... *G03B 15/02* (2013.01); *B29D 11/00307* (2013.01); *B29D 11/00365* (2013.01); *B29D 11/00663* (2013.01); *B29D 11/00692* (2013.01); *G02B 6/0011* (2013.01); *G02B 13/0085* (2013.01); *G02B 19/0061* (2013.01)

(58) Field of Classification Search
CPC . G02B 13/0085; G02B 19/0061; G03B 15/02
USPC .......... 362/335, 800, 249.02, 11–18, 311.02, 362/331; 257/797, 98–100; 359/290, 291, 359/385, 389, 315
See application file for complete search history.

(56) References Cited

U.S. PATENT DOCUMENTS 7,974,023 B1 *  7/2011  Chen .............................. 359/819
8,364,032 B2    1/2013  Chow et al.
(Continued)

FOREIGN PATENT DOCUMENTS

KR   10-2006-0071615   6/2006
WO   2008/084892      7/2008
(Continued)

OTHER PUBLICATIONS

International Preliminary Report on Patentability and Written Opinion in PCT Application No. PCT/CH2012/000229 (Apr. 8, 2014).
(Continued)

*Primary Examiner* — Jason Moon Han
(74) *Attorney, Agent, or Firm* — Fish & Richardson P.C.

(57) ABSTRACT

The optical system comprises a base plate having a first plate side and a second plate side, a light guide element located substantially on said first plate side and a lens element located on said second plate side. The base plate and the light guide element are integrally formed or are distinct parts, and the base plate is at least partially transparent The optical system forms a light path for light passing through said lens element, across said base plate and through said light guide element, and wherein said base plate comprises at least one mechanical guiding element. The method for manufacturing such an optical system comprises providing a wafer comprising a multitude of said base plates.

37 Claims, 5 Drawing Sheets

(51) Int. Cl.
*G02B 13/00* (2006.01)
*G02B 19/00* (2006.01)

(56) References Cited

U.S. PATENT DOCUMENTS

2004/0119403 A1* 6/2004 McCormick et al. ......... 313/506
2008/0260372 A1* 10/2008 Shin .............................. 396/176
2010/0013113 A1 1/2010 Chang
2011/0013292 A1* 1/2011 Rossi et al. ................... 359/738
2011/0037887 A1* 2/2011 Lee et al. ...................... 348/340
2011/0211261 A1* 9/2011 Fukuta ........................... 359/642

FOREIGN PATENT DOCUMENTS

WO  WO 2008/084892  7/2008
WO  2009/067832  6/2009
WO  2009/076788  6/2009

OTHER PUBLICATIONS

Eurooean Patent Office, International Search Report in international application PCT/CH2012/000229 (Jan. 7, 2013).

* cited by examiner

MICRO-OPTICAL SYSTEM AND METHOD OF MANUFACTURE THEREOF

TECHNICAL FIELD

The invention relates to the field of optics, more particularly to micro-optics. It relates to methods and apparatuses according to the opening clauses of the claims. In particular, it relates to optical systems, opto-electronic modules, electronic devices and to appliances as well as to methods of manufacturing an optical system.

DEFINITION OF TERMS

"Active optical component": A light sensing or a light emitting component. E.g., a photodiode, an image sensor, an LED, an OLED, a laser chip.

"Passive optical component": An optical component redirecting light by refraction and/or diffraction and/or reflection such as a lens, a prism, a mirror, or an optical system, wherein an optical system is a collection of such optical components possibly also comprising mechanical elements such as aperture stops, image screens, holders.

"Opto-electronic module": A component in which at least one active and at least one passive optical component is comprised.

"Replication": A technique by means of which a given structure or a negative thereof is reproduced. E.g., etching, embossing, imprinting, casting, molding.

"Wafer": A substantially disk- or plate-like shaped item, its extension in one direction (z-direction or vertical direction) is small with respect to its extension in the other two directions (x- and y-directions or lateral directions). Usually, on a (non-blank) wafer, a plurality of like structures or items are arranged or provided therein, typically on a rectangular grid. A wafer may have opening or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material comprising metals and polymers or polymers and glass materials. In particular, hard-enable materials such as thermally or UV-curable polymers are interesting wafer materials in conjunction with the presented invention.

"Lateral": cf. "Wafer"

"Vertical": cf. "Wafer"

"Light": Most generally electromagnetic radiation; more particularly electromagnetic radiation of the infrared, visible or ultraviolet portion of the electromagnetic spectrum.

BACKGROUND OF THE INVENTION

It is known to provide, in today's smart phones, miniaturized optics such as flash LEDs emitting light through a diffractive lens to the outside of the smart phone.

SUMMARY OF THE INVENTION

It is one object of the invention is to provide a new concept for the design and/or for the manufacture of miniaturized optical systems. In addition, corresponding opto-electronic modules comprising such optical systems shall be provided as well as electronic devices comprising such optical systems and opto-electronic modules, respectively. Furthermore, methods for manufacturing optical systems shall be provided.

Another object of the invention is to provide an alternative way of arranging components in an optical system or in an opto-electronic module, in particular in a miniaturized optical system or a miniaturized opto-electronic module.

Another object of the invention is to provide a new concept for arranging a miniaturized optical system or an opto-electronic module in an electronic device.

Another object of the invention is to provide an improved method for manufacturing optical systems, in particular miniaturized optical systems.

Another object of the invention is to provide optical systems and/or opto-electronic modules and/or electronic devices with an improved manufacturability, in particular allowing for stable and/or reproducible and/or high-yield mass production.

Another object of the invention is to achieve particular tight alignment tolerances of components in an optical system or an opto-electronic module, in particular in a miniaturized optical system or miniaturized opto-electronic module.

Further objects emerge from the description and embodiments below.

At least one of these objects is at least partially achieved by apparatuses and methods according to the patent claims.

The optical system comprises a base plate having a first plate side and a second plate side, a light guide element located substantially on said first plate side and a lens element located on said second plate side, wherein said base plate and said light guide element are integrally formed or are distinct parts. Said base plate is at least partially transparent, and the optical system forms a light path for light passing through said lens element, across said base plate and through said light guide element, and said base plate comprises at least one mechanical guiding element.

The terms "transparent" and "non-transparent" as used in the present patent application shall generally be read as carrying their commonly assigned meaning. More specifically, using the term "transparent" in the present patent application, we mean transparent for or penetratable by light, in particular referring to at least a portion of visible light; and using the term "non-transparent," we mean not transparent for or not penetratable by at least a portion of light, in particular referring to at least a portion of visible light, more particularly not transparent for or not penetratable by visible light. In conjunction with an opto-electronic module, the transparency or non-transparency may more specifically be understood to concern light of a wavelength range emittable by or detectable by an active optical component comprised in the opto-electronic module.

Said light guiding element may be substantially a block of transparent material. Said base plate may, in particular because of its at least one mechanical guiding element and possibly together with said light guiding element, facilitate a precise alignment of the optical system and/or a precise fixation of the optical system. If said base plate and said light guide element are distinct parts, different materials can be used for them, and process steps can readily be applied to them separately. If they are integrally formed, they can be manufactured in common process steps, thus simplifying the manufacture.

The optical system may be efficiently manufacturable, in particular on wafer scale, as will become clear below. It is possible that one or more assembly steps and/or alignment steps can be dispensed with.

The optical system may describe a light path which not only is well defined within the optical system, but which, in addition, is readily precisely alignable with respect to other parts such as with respect to a housing of an electronic device.

In one embodiment, said light guide element has an axis described by its shape and said lens element has an axis described by its shape, and these axes are identical and are aligned perpendicular to said base plate.

In one embodiment which may be combined with one or more of the before-addressed embodiments, the optical system is manufactured on wafer-scale. The application and/or manufacture of said lens elements may be carried out on wafer-level.

In one embodiment which may be combined with the before-addressed embodiment, said base plate is
substantially made of a transparent material; or
comprises a first portion of a non-transparent material and a second portion of a transparent material, in particular wherein said second portion is encompassed by said first portion.

The former possibility may simplify the manufacture. The latter possibility may improve the optical properties of the optical systems by forming an aperture and/or by minimizing an amount of light escaping the optical system at or to undesired locations.

Ways of efficiently (in particular wafer-scale) manufacturing base plates comprising a first portion of a non-transparent material and a second portion of a transparent material, in particular wherein said second portion is encompassed by said first portion, can be inferred from in the not-yet published U.S. provisional application filed on Jul. 19, 2011 with the application No. 61/509,357, which therefore is herewith incorporated by reference in this application. It is in particular pointed to what is referred to as "semi-finished part" or "combined semi-finished part" in U.S. 61/509,357, see, e.g., reference symbols ow, ow', FIGS. 4, 8 to 11, 15 and 16 and the corresponding description text. Although a provision of mechanical guiding elements may not be disclosed in U.S. 61/509,357, this may be accomplished, e.g., by drilling holes or by providing alignment pins, e.g., by gluing these or replicating these, or by other ways, e.g., by other ways (of providing of mechanical guiding elements) described in the present patent application.

Usually, said base plate is substantially plate-shaped.

In one embodiment which may be combined with one or more of the before-addressed embodiments, said at least one mechanical guiding element is provided for defining an alignment of the optical system with respect to a member to which the optical system is to be fixed. In particular, said at least one guiding element may be a mechanical fixing element, more particularly a mechanical fixing element for mechanically fixing said optical system to a member to which the optical system is to be fixed, e.g., to a housing of an electronic device.

In one embodiment which may be combined with one or more of the before-addressed embodiments, said at least one mechanical guiding element comprises at least one of
a protrusion protruding from said base plate;
a recess in said base plate; and
an edge, in particular an edge of said base plate.

In particular, said a least one mechanical guiding element may comprise at least one of
an alignment pin; and
a hole in said base plate; wherein the hole may be a through-hole or a blind hole.

In one embodiment which may be combined with one or more of the before-addressed embodiments, at least two mechanical guiding elements are provided. Providing at least two mechanical guiding elements on said first plate side may allow to achieve an improved aligning accuracy with respect to a member to which the optical system shall be fixed at its first plate side and/or an improved fixation to such a member. Providing at least one mechanical guiding element on said first plate side and at least one mechanical guiding element on said second plate side may allow to achieve a high aligning accuracy with respect to a member to which the optical system shall be aligned at its first plate side and with respect to a member to which the optical system shall be aligned at its second plate side, and/or may allow to achieve an improved fixation to such members. At least a second mechanical guiding element on any one side, in particular on said second plate side may allow to achieve an improved aligning accuracy and/or an improved fixation.

In one embodiment which may be combined with one or more of the before-addressed embodiments, said lens element is made of a hardened hardenable material, in particular of a cured curable material. E.g., said lens element can be made of an epoxy or of a thermopast.

In one embodiment which may be combined with one or more of the before-addressed embodiments, said lens element is manufactured using replication. By means of replication, in particular by means of embossing, it is possible to manufacture small optical structures with very high precision. It can be applied on wafers, thus enabling an efficient mass production.

In one embodiment which may be combined with one or more of the before-addressed embodiments, said lens element comprises, in particular is, a lens, wherein the lens can be a diffractive or a refractive lens, or a diffractive and refractive lens. It is possible that said lens element makes use of total internal reflection (TIR).

In one embodiment which may be combined with one or more of the before-addressed embodiments, said lens element protrudes from said base plate. In particular, the lens element can be manufactured to be sitting on the base plate.

In one embodiment which may be combined with one or more of the before-addressed embodiments, said light guiding element is of substantially prismatic shape, in particular of substantially cylindrical shape.

In one embodiment which may be combined with one or more of the before-addressed embodiments, said light guiding element protrudes from said base plate.

In one embodiment which may be combined with one or more of the before-addressed embodiments, said light guiding element comprises at least one side wall on which a coating is applied. A non-transparent coating can prevent or minimize an amount of light escaping the optical system (more particularly escaping the light guiding element) at or to undesired locations.

In one embodiment which may be combined with one or more of the before-addressed embodiments, said light guiding element comprises, at an end distal from said base plate, a top wall, said top wall being substantially flat and aligned substantially parallel to said base plate. To said top wall, a coating can be applied, in particular a scratch-resistant coating and/or an anti-smudge coating. An anti-smudge coating (or smudge-resistant coating) decreases adhesion such that dirt or other, in particular moist, material adheres only weakly to the surface and/or makes the surface more easily cleanable.

Suggested techniques for coatings applied to parts of the optical system in general are physical vapor deposition (PVD), e.g., sputtering, chemical vapor deposition (CVD), spray coating, dip coating and/or others.

In order to accomplish a coating on only a portion of a member, e.g., on only a portion of said optical system, said base plate or said light guiding element, it is possible to use, e.g., lithographic processes. It is possible to apply the coating to more than the portion to be coated and subsequently remove the coating from surfaces on which it is not desired, e.g., by means of etching or polishing.

In one embodiment which may be combined with one or more of the before-addressed embodiments, said base plate laterally exceeds said light guide element and said lens element in at least two directions. This may provide an improved mechanical stability when fixing the optical system to another member. And, this may enable a suitable arrangement of two mechanical guiding elements, namely in areas in which said base plate laterally exceeds said light guide element and said lens element.

The opto-electronic module comprises an optical system according to the invention and at least one active optical component.

In one embodiment of the opto-electronic module, said at least one active optical component comprises at least one light emitting element, in particular at least one light emitting diode (LED). More particularly, said light emitting element can be a light emitting element for emitting light flashes, i.e. high-intensity short-duration light pulses, e.g., like used for flash photography. Suitable LEDs are LEDs also referred to as "high-brightness LEDs".

Alternatively, a light-detecting element such as a photo diode or a pixel sensor may be provided as an active optical component.

In one embodiment of the opto-electronic module which may be combined with the before-addressed embodiments, the opto-electronic module comprises a casing portion to which said at least one active optical component is attached, wherein said casing portion is attached to said base plate. In particular, said casing portion may be attached to said second plate side; and/or said casing portion may be aligned with respect to and/or attached to said base plate using one or more or said at least one mechanical guiding elements. It can furthermore be provided that a distance between said at least one active optical component and said at least one passive optical component is defined by said casing portion.

Such embodiments may enable a wafer-scale fabrication of high-precision opto-electronic modules, more particularly of opto-electronic modules in which an active optical component and a lens element are aligned with respect to each other with high precision, wherein lateral precision is achievable because of the mechanical guiding elements, and vertical precision because of the casing portion.

The electronic device comprises an optical system according to the invention or even an opto-electronic module according to the invention.

In one embodiment, the electronic device comprises a housing, said housing comprising
　an opening in which at least a portion of said light guiding element is arranged; and
　at least one mechanical guiding element structured and arranged for cooperating with said at least one mechanical guiding element of said optical system.

This way, a well-defined, precisely aligned light entrance through the housing may be accomplished. And, it is possible to provide a suitable well-aligned fixation of the optical system (or of the opto-electronic module) to the housing.

The electronic device may be, e.g., a hand-held communication device or a hand-held digital music playing device or a photographic device, in particular a smart phone or a photo camera or a video camera. In such applications, space is usually extremely scarce. The invention can make it possible to produce and align and fix optical systems with high precision, in particular wherein the optical systems are very small in dimension, e.g., maximum lateral dimension below 10 mm, in particular below 7 mm, maximum vertical dimension below 6 mm, more particularly below 4 mm. Lateral alignment precisions of better than ±50 µm and even better than ±40 µm can be achieved in mass production, on wafer level.

The appliance according to the invention comprises a multitude of optical systems according to the invention arranged with their respective base plates substantially in a common plane. This appliance can be considered a wafer of optical systems. The optical systems can be produced by producing such a wafer and subsequently separating the wafer into individual optical systems. In the wafer, the optical systems are typically arranged side by side. In the wafer, the base plates are usually portions of one and the same plate, the plate being a constituent of the wafer.

The method for manufacturing an optical system according to the invention comprises providing a wafer comprising a multitude of said base plates. This can make wafer-level manufacturing possible.

In one embodiment of the method, the method comprises manufacturing said lens element using replication, in particular using embossing. In particular, the lens element is manufactured using a process not used during manufacturing said light guiding element and/or not used during manufacturing said base plate. As it turned out, embossing, in particular, can make it possible to achieve structures which are smaller and/or are better defined than what is achievable with today's injection molding.

In one embodiment of the method which may be combined with the before-addressed method embodiment, said wafer comprises at least one first alignment mark and the method comprises replicating lens elements on said wafer using a replication tool comprising at least one second alignment mark, and the method further comprises an alignment step in which said at least one first alignment mark is aligned with respect to said at least one second alignment mark. Such alignment marks can make it possible to precisely position a multitude of lens elements with respect to associated base plates in a single alignment step. Usually, there will be at least two first and at least two second alignment marks.

In one embodiment of the method which may be combined with one or both of the before-addressed method embodiments, said wafer comprises a multitude of said optical systems.

In one embodiment of the method referring to the last-addressed embodiment, the method comprises separating said wafer into a multitude of said optical systems. Separating, sometimes also referred to as dicing, may be accomplished, e.g., by laser cutting, by punching or by sawing, e.g., using a wafer saw or dicing saw.

In one embodiment of the method which may be combined with one or more of the before-addressed method embodiments, the method comprises applying to side walls of said light guiding element a coating, in particular a non-transparent coating. This may be accomplished, e.g., by applying a coating and subsequently polishing or etching one or more other walls of said light guiding element which need to be transparent, e.g., a top wall of the light guiding element, in particular at top wall which is substantially flat and supposed to be aligned substantially parallel to said wafer.

Three different manufacturing methods are described in the following which may all be combined with one or more of the before-addressed method embodiments.

First Method:

The first method comprises manufacturing said wafer comprising said multitude of base plates using an injection molding process. This method is referred to as first method. This way, it is possible to manufacture said multitude of base plates in substantially one process. Alternatively, also other replication methods might be used instead of injection molding.

In one embodiment of the first method, also said multitude of light guiding element is manufactured in said injection molding process. This can provide a reduction of process steps for the manufacture of the optical system.

In one embodiment of said first method which may be combined with the last-addressed embodiment of the first method, the method comprises providing a top wall of said light guiding element which is substantially flat and aligned substantially parallel to said wafer with a coating, in particular with a scratch-resistant coating and/or with a smudge-resistant coating.

In one embodiment of said first method which may be combined with one or both of the two last-addressed embodiments of the first method, the method comprises applying a thinning process for thinning the injection-molded material, in particular for reaching a pre-determined thickness of said base plates. The thinning process may comprise, e.g., lapping and/or polishing and/or machining and/or milling. It is possible that the provision of an initially thicker wafer is of advantage, e.g., because it provides more mechanical stability, and/or because it provides more dimensional stability, and/or because it allows to achieve a desired or pre-determined thickness of the base plates with a particularly high precision and/or accuracy.

Second Method:

The second method comprises manufacturing said light guiding elements using a micro-machining process, in particular in a mechanical micro-machining process, more particularly a milling process In one embodiment of said second method, also said mechanical guiding elements are formed by means of said micro-machining. This can provide a reduction of process steps in the manufacture of the optical system.

In one embodiment of said second method which may be combined with the last-addressed embodiment, said micro-machining process is applied to a blank wafer, wherein it is in particular possible that said blank wafer comprises a coating, in particular a scratch-resistant coating and/or a smudge-resistant coating. This can make it possible to obtain coated light guiding elements using less manufacturing steps.

In one embodiment of said second method referring to the last-addressed embodiment of the second method, the method comprises applying a thinning process for thinning the material of said blank wafer after having conducted said micro-machining process. In particular, this can be carried out for reaching a pre-determined thickness of said base plates. The thinning process may comprise, e.g., lapping and/or polishing and/or machining and/or milling. It is possible that the provision of an initially thicker wafer is of advantage, e.g., because it provides more mechanical stability, and/or because it provides more dimensional stability, and/or because it allows to achieve a desired or pre-determined thickness of the base plates with a higher precision or accuracy.

It is to be noted that the following embodiment may refer to any embodiment of the first as well as to the second method: An embodiment in which the method comprises jointly manufacturing said wafer and said light guiding element using the same type of process. This can be accomplished using, e.g., a replication process, e.g., using injection molding, or micro-machining such as, e.g., milling.

Third Method:

The third method comprises assembling a multitude of said light guiding elements on said wafer. The assembling may comprise, e.g., gluing, in particular using an epoxy resin, more particularly a radiation-curable epoxy resin.

In one embodiment of the third method, the method comprises manufacturing said multitude of said light guiding elements, in particular, wherein the manufacturing of said light guiding elements is carried out using process steps which do not contribute to the manufacture of said base plates and/or said lens elements. Furthermore, said manufacturing said multitude of said light guiding elements may comprise obtaining at least a portion of said multitude of said light guiding elements by dividing a chunk of material into a plurality of parts.

In one embodiment of the third method referring to the last-addressed embodiment, said manufacturing said multitude of said light guiding elements comprises obtaining said multitude of said light guiding elements by cutting at least one rod into parts, in particular wherein said at least one rod is substantially made of glass or of a transparent polymer material. Said cutting said rod may in particular comprise sawing or laser cutting. E.g., a rod can be used which has the same cross-sectional shape as the light guiding elements shall have.

In one embodiment of the third method referring to the last-addressed embodiment, the method comprises providing said multitude of said light guiding elements with at least one coating, in particular providing side walls of said light guiding elements with a non-transparent coating and/or providing top walls of said light guiding elements with a scratch-resistant coating or a smudge-resistant coating. Such coatings may be applied with the light guiding elements not yet arranged on the wafer.

In one embodiment of the third method referring to the third-last-addressed embodiment, said manufacturing said multitude of said light guiding elements comprises obtaining said multitude of said light guiding elements by cutting at least one plate or disk into parts, in particular wherein said at least one plate or disk is substantially made of glass or of a transparent polymer material.

In one embodiment of the third method referring to the last-addressed embodiment, said plate or disk comprises a top wall comprising a coating, in particular a scratch-resistant coating.

The invention comprises methods with features of corresponding optical systems according to the invention, and, vice versa, also optical systems with features of corresponding methods according to the invention.

The advantages of the methods basically correspond to the advantages of corresponding optical systems, and, vice versa, the advantages of the optical systems basically correspond to the advantages of corresponding methods.

The invention can make possible mass production of optical systems and devices or members comprising optical systems with high demands concerning manufacturing tolerances.

Further embodiments and advantages emerge from the dependent claims and the figures.

BRIEF DESCRIPTION OF THE DRAWINGS

Below, the invention is described in more detail by means of examples and the included drawings. The figures show.

The described embodiments are meant as examples and shall not confine the invention.

DETAILED DESCRIPTION OF THE INVENTION

Figure 1:
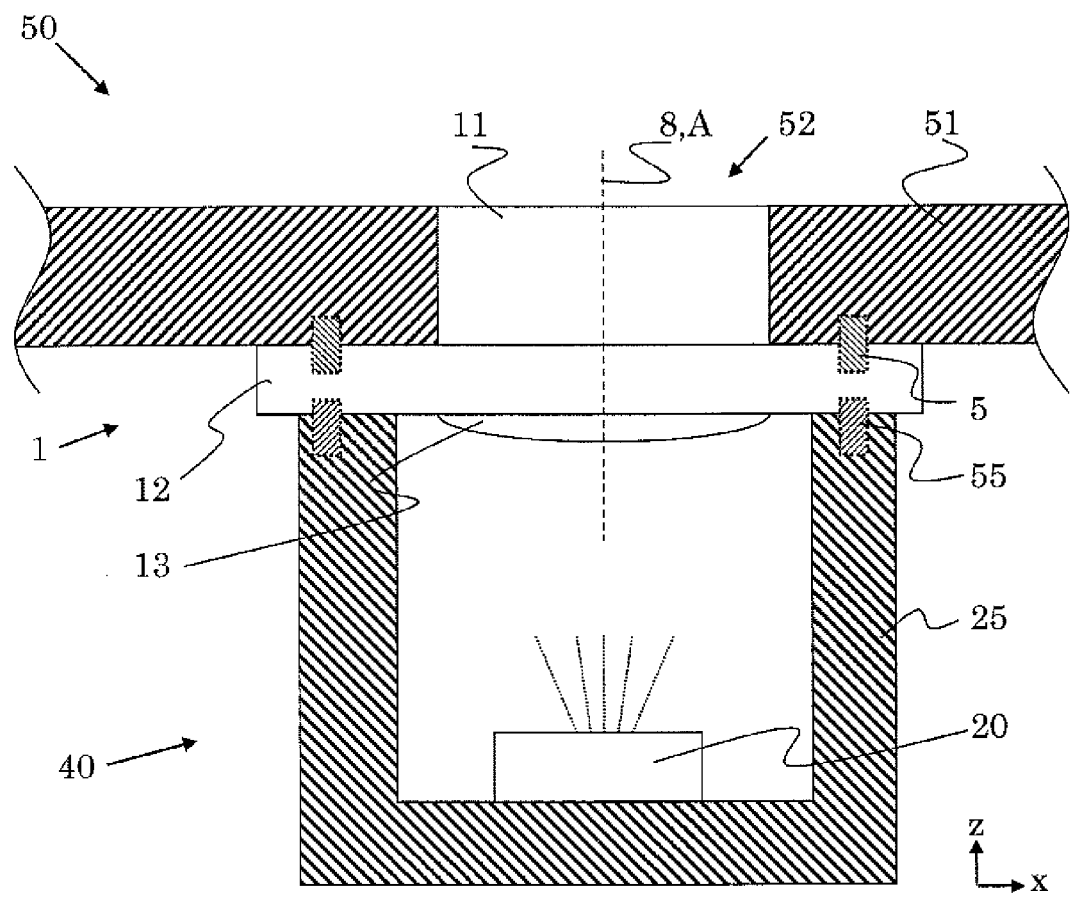
FIG. 1 a schematic cross-sectional view of a detail of an electronic device comprising an opto-electronic module comprising an optical system.

FIG. 1 shows a schematic cross-sectional view of a detail of an electronic device 50 comprising an opto-electronic module 40 comprising an optical system 1. Electronic device 50 comprises a housing 51 in which an opening 52 is provided, e.g., in form of a through-hole, e.g., of circular cross-section. Optical system 1 comprises a light guiding element 11, a base plate 12 and a lens element 13. Light guiding element 11 and base plate 12 may be distinct parts or form a unitary part. Light guiding element 11, or at least a portion thereof, is arranged in opening 52.

Opto-electronic module 40 comprises optical system 1 and an active optical component 20, such as an LED 20, and a casing portion holding LED 20. Casing portion 25 can be a unitary part, as schematically shown in FIG. 1, or may comprise two or more parts. It ensures a precise and constant relative positioning of LED 20 with respect to optical system 1, both, laterally and vertically. The vertical direction is designated as z in FIG. 1 and is the direction perpendicular to base plate 12, and the lateral directions are the directions in the plane defined by base plate 12, such as the direction x in FIG. 1 and/or direction y in FIG. 2.

Casing portion 25 is laterally positioned relative to optical system 1 by means of mechanical guiding elements 55 of which at least one, usually two or even three or four are provided. Each of these mechanical guiding elements 55 cooperates with a mechanical guiding element at the respective other part, e.g., a guiding pin of casing portion 25 interacts with a hole in base plate 12, or vice versa. The vertical alignment is mainly ensured by a vertical extension of casing 25, with active optical component 20 attached thereto in a well-defined and precise vertical position. The lateral position of active optical component 20 in casing 25 of course has to be well-defined and precise, too Base plate 12 comprises two mechanical guiding elements 5, such as alignment pins, cooperating with mechanical guiding elements of housing 51, such as holes, wherein it is also possible to provide only one mechanical guiding element, in particular because also light guiding element 11 can also function as a mechanical guiding element and/or because guiding element 5 can be designed to provide protection against rotation of optical system 1 when cooperating with the mechanical guiding elements of housing 51, e.g., by providing rectangular or triangular or star-shaped lateral cross-sections. It is also possible to produce holes in base plates 12 as mechanical guiding elements 5 which cooperate with pins of housing 51.

Mechanical guiding elements 5 and 55 or some of them, can, in addition, also be provided for fixing optical system 1 to housing 51 and to casing portion 25, respectively, e.g., by providing threads or windings or a snap fit. But it is also possible to provide that the actual fixing is, at least in part, provided differently, e.g., by gluing, such as by applying an epoxy glue and hardening the glue, e.g., by curing such as by radiation curing or thermal curing.

Usually, light guiding element 11 describes an axis, e.g., a central axis. And usually, also lens element 13 describes an axis, usually its optical axis. These axes are usually vertically aligned, and it is attempted during manufacture of optical system 1 that these axes coincide as precisely as possible, forming one axis A. Furthermore, also active optical component 20 usually describes an axis, e.g., its main direction of light emission, and this axis is usually also meant to coincide with axis A.

A (central) light path 8 of light to or from active optical component 20 would thus run along axis A through lens element 13, base plate 12 and light guiding element 11. In case of a pixel sensor as an active optical component 20, the central vertical symmetry axis of the pixel sensor would be meant to coincide with axis A.

Base plate 12 may be made substantially of a transparent material such as a transparent polymer. In that case, it can be useful to provide at least its side walls (which have laterally aligned surface normals) with a coating, in particular with a non-transparent coating. But it is also possible to provide that base plate 12 has at least one transparent portion and at least one non-transparent portion (not shown in FIG. 1), e.g., the non-transparent portion being substantially made of a non-transparent material.

Lens element 12 can be, e.g., a diffractive or a refractive lens or a refractive and diffractive lens, or may comprise two or more lenses. It may also make use of total internal reflection (TIR).

Electronic device 50 can be, e.g., a photographic device or a hand-held communication device such as a mobile phone, in particular a smart phone. In particular in the latter, space is very scarce such that optical systems 1 arranged therein have to be as small as possible.

Typical dimensions of base plates 12 are laterally below 10 mm, in particular below 7 mm, and vertically below 0.6 mm, in particular below 0.4 mm. Typical dimensions of light guiding elements 11 are laterally below 5 mm, in particular below 3.5 mm, and vertically below 3 mm, in particular below 2 mm. Typical dimensions of lens elements 11 are laterally below 5 mm, in particular below 3.5 mm and vertically below 1.5 mm, in particular below 1 mm.

Figure 2:
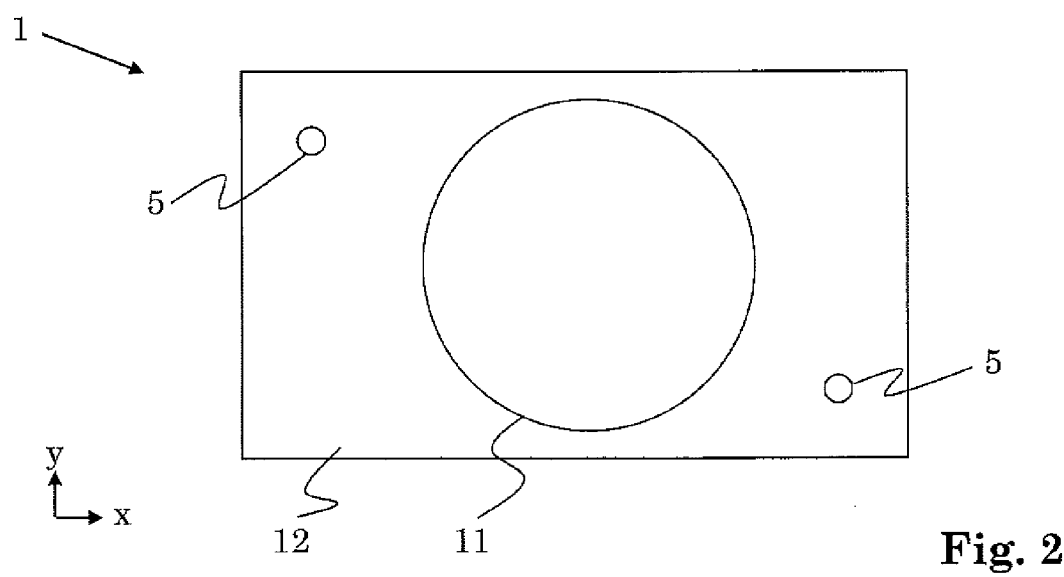
FIG. 2 a schematic top view of the optical system of FIG. 1.

FIG. 2 is a schematic top view of the optical system 1 of FIG. 1. Since, as visible in FIG. 2, the mechanical guiding elements 5 are not in the central x axis of optical system 1, they are drawn by dashed lines in FIG. 1.

Figure 3:
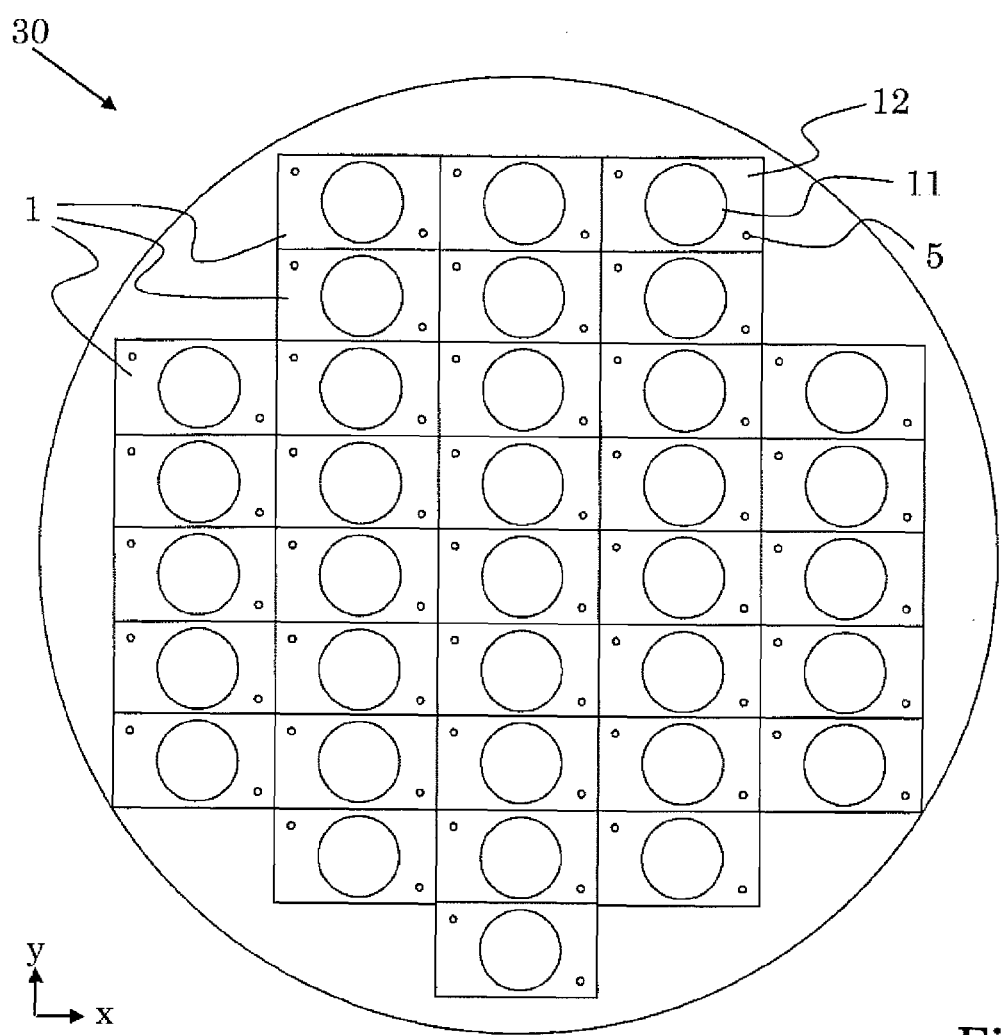
FIG. 3 a schematic top view of a wafer of optical systems of FIG. 1.

FIG. 3 is a schematic top view of an appliance 30, more particularly of a wafer 30 of optical systems of FIG. 1. A mass production of optical systems 1 is possible using a wafer-scale production method. High alignment precision and high-yield high-productivity manufacturing can be accomplished, this way. Below, three different manufacturing methods are described in greater detail.

Figure 4:
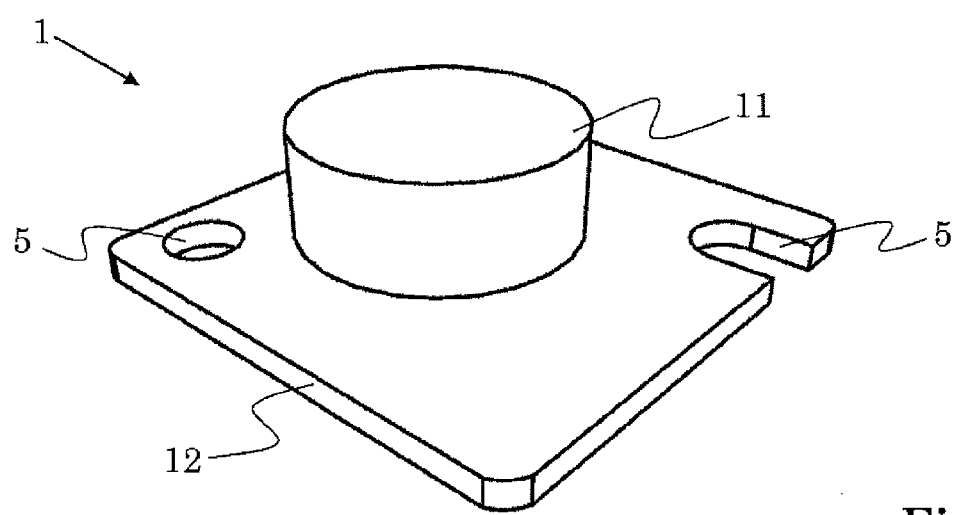
FIG. 4 a perspective view of an optical system.

FIG. 4 is a perspective view of a similar optical system as the one shown in FIGS. 1 and 2. The manufacturing methods described in reference to FIGS. 5 to 10, FIGS. 11 to 16 and FIGS. 17 to 23, respectively, refer to this optical system 1, but can as well be applied for manufacturing the optical systems of FIGS. 1 to 3. The rounded corners of the of the base plate 12 shown in FIG. 4 can readily be produced using, e.g., laser cutting or ultrasonic cutting.

FIGS. 5 to 10 provide a cross-sectional illustration of a first wafer-level manufacturing method for manufacturing optical systems of FIG. 4.

Figure 5:
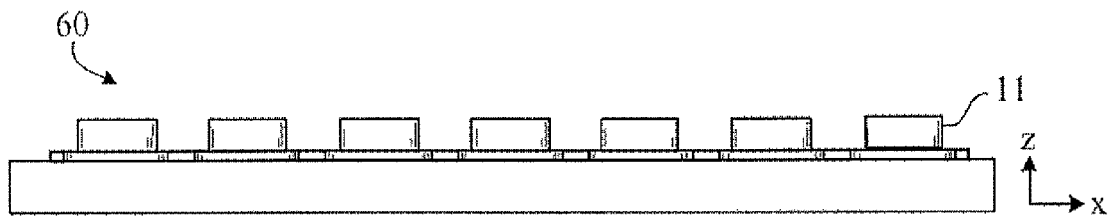
FIGS. 5 to 10 a cross-sectional illustration of a first wafer-level manufacturing method for manufacturing optical systems of FIG. 4.

In the first method, a wafer 60 is manufactured by means of an injection molding technique (FIG. 5). A wafer comprises typically more than 10, more typically more than 50 or even more than 100 or more than 500 equal items, c.f. also FIG. 3 in which a wafer 30 comprising 35 optical systems 1 is illustrated. The light guiding elements 11 are formed in the injection molding process, and the mechanical guiding elements 5 may also be formed already in the injection molding process.

Figure 6:
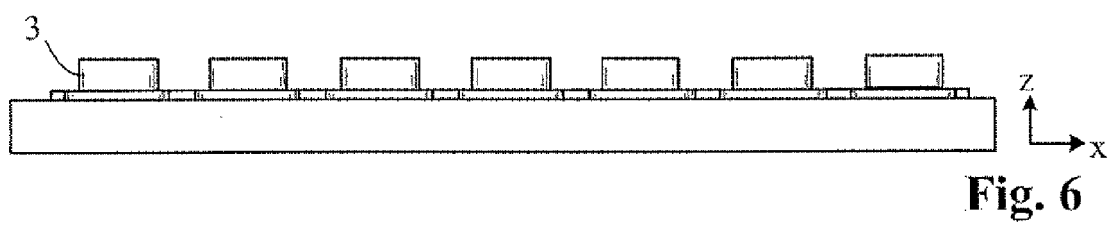

Side walls of the light guiding elements 11 are then—optionally—provided with a coating, in particular with a non-transparent coating 3, e.g., a black chromium coating, cf. FIG. 6. For this, e.g., the whole wafer 60 can be coated, and then, the coating is removed, e.g., by polishing or etching, where it is not desired, e.g., on the top face of the light guiding elements 11 and on the (flat) back face (bottom face) of wafer 60.

Figure 7:
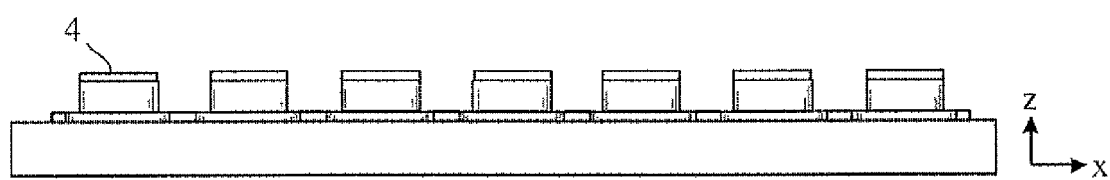

Then, optionally, a coating 4 such as a scratch-resistant coating is applied to the top faces of the light guiding elements 11, cf. FIG. 7. Also for this, e.g., the whole wafer 60 can be coated.

The coatings mentioned in the present patent application may be applied using at least one of PVD, CVD, dip coating, spray coating, sputtering, evaporating.

Figure 8:
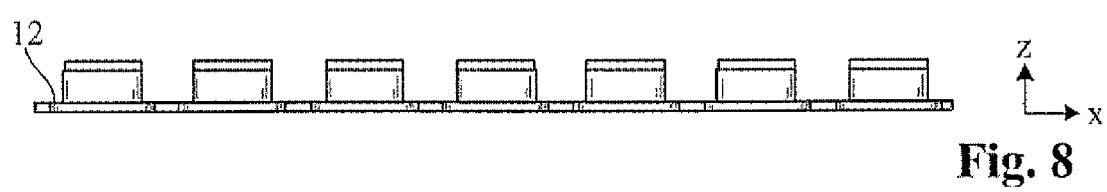

An optional step, which, however, may result in an improved manufacturability due to an initially increased stability of the wafer, is a thinning of wafer 60 from the back face. This may be accomplished, e.g., by lapping. This may allow to achieve a higher precision in thickness of the base plates 12 than would be achievable using injection molding only. Furthermore, a removal of undesired coatings on the back face of the wafer is simultaneously achieved. And, when polishing or machining is carried out, the surface quality/optical quality can be improved with respect to what is achievable by injection molding. The resulting wafer is illustrated in FIG. 8.

Figure 9:
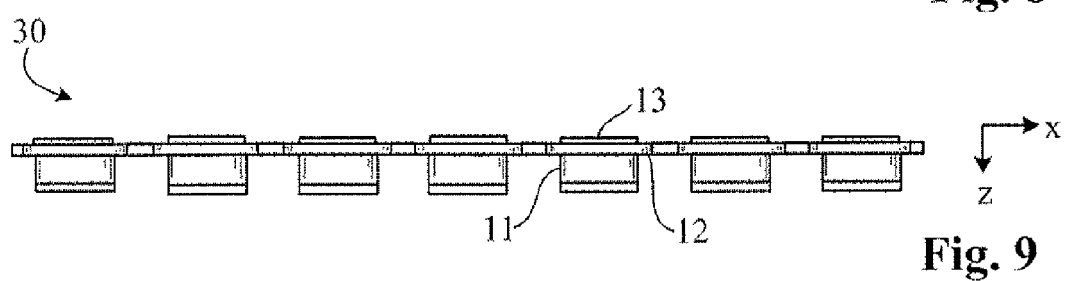
Figure 10:
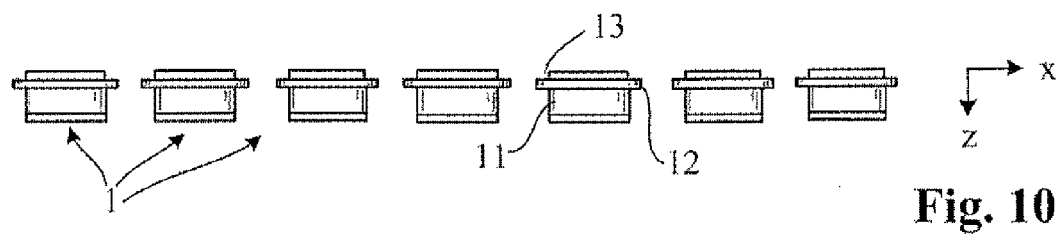

Then, the lens elements 13 are applied on the back face of the wafer, cf. FIG. 9. This can be accomplished with very high precision by means of replication, more particularly by means of embossing. In particular in case of replication, it can lead to increased precision to provide one or rather more alignment marks on a replication tool used for the replication and also on the wafer. It is also possible to apply the lens elements 13 using gluing, e.g., applying a (e.g., liquid) glue to the back face of the wafer or to pre-fabricated lenses and then placing (the) pre-fabricated lenses on the back face of the wafer, e.g., by means of pick-and-place.

In the embossing process, a multitude of lens elements 11 or even all lens elements 11 on wafer 30 can be produced at a time, i.e. in one embossing process. It is possible to provide that a replication tool or stamp used for producing the lens elements 13 is, with respect to the position of the lens elements, specifically adapted to the position of the light guiding elements according to the mold used in the injection molding. This can greatly enhance yield and precision. E.g., a mold is fabricated and then, the positions corresponding to the light guiding elements are measured either at the mold itself, or a wafer is produced by injection molding using that mold, and then the positions of the light guiding elements are measured at the so-obtained wafer. Then, a replication tool such as a stamp for the manufacture of the lens elements is manufactured, e.g., using recombination, wherein the positions for the lens elements 13 are chosen in dependence of the measurements carried out at the mold. Accordingly, the replication tool can be designed such that each lens element is properly aligned with respect to a light guiding element and that positional errors and imprecisions of the mold are reproduced in the replication tool. Thus, after singulation, each optical system will comprise a lens element which is precisely aligned with respect to a light guiding element.

This way, a wafer 30 of optical systems 1 is obtained, cf. FIG. 9. This wafer 30 is then separated into distinct optical systems 1, e.g., using laser cutting or sawing, cf. FIG. 10.

Figure 11:
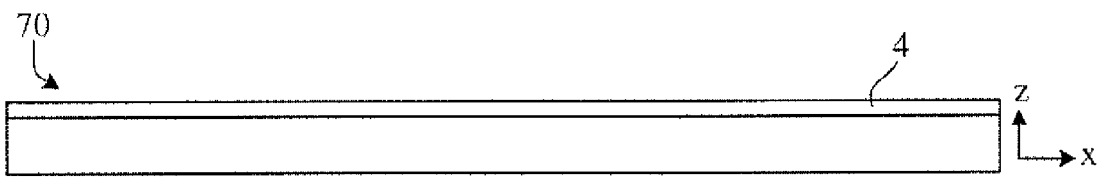
FIGS. 11 to 16 a cross-sectional illustration of a second wafer-level manufacturing method for manufacturing optical systems of FIG. 4.

FIGS. 11 to 16 provide a cross-sectional illustration of a second wafer-level manufacturing method for manufacturing optical systems of FIG. 4. This second method starts with a blank wafer 70 which may, as indicated in FIG. 11, comprise a coating 4 such as an anti-scratch and/or an anti-smudge coating.

Figure 12:
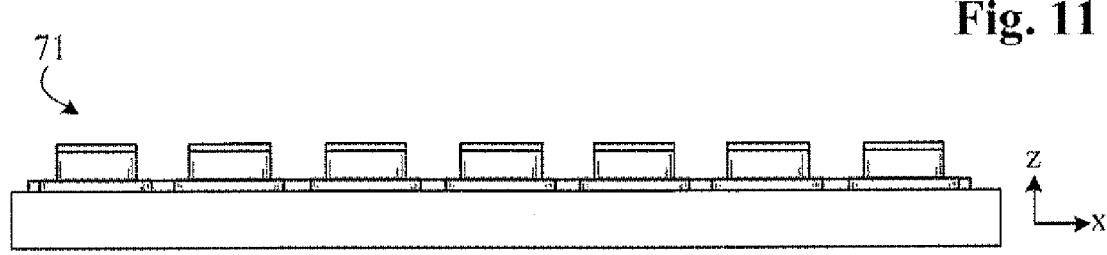

Blank wafer 70 is then processed by micro-machining, e.g., milling, for forming light guiding elements 11 and mechanical guiding elements 5. FIG. 12 illustrates the so-obtained wafer.

Figure 13:
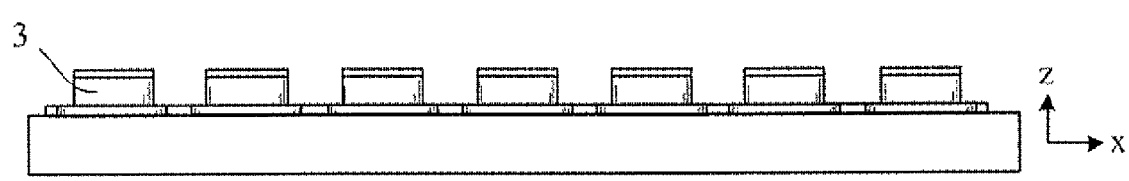

Then—optionally—a coating 3 is applied to the side walls of the light guiding elements 11, a FIG. 13. For details, cf. the explanations given in conjunction with FIG. 6.

Then, optionally and if the blank wafer has not already been suitably coated, a coating 4 such as a scratch-resistant coating is applied to the top faces of the light guiding elements 11. For details, cf. the explanations given in conjunction with FIG. 7.

Figure 14:
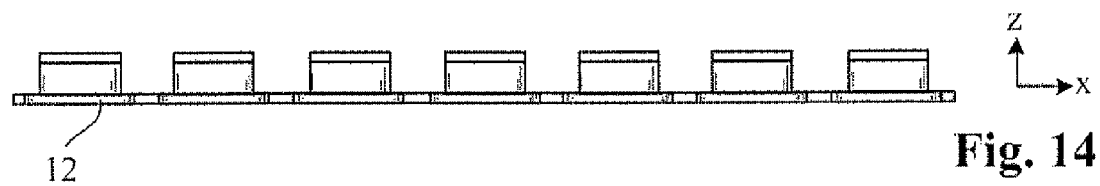

Then, optionally, a thinning of the wafer from the back face is accomplished, cf. FIG. 14. For details, cf. the explanations given in conjunction with FIG. 8.

Figure 15:
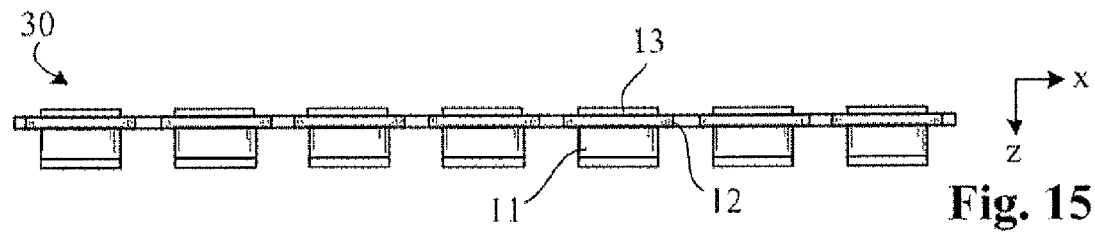
Figure 16:
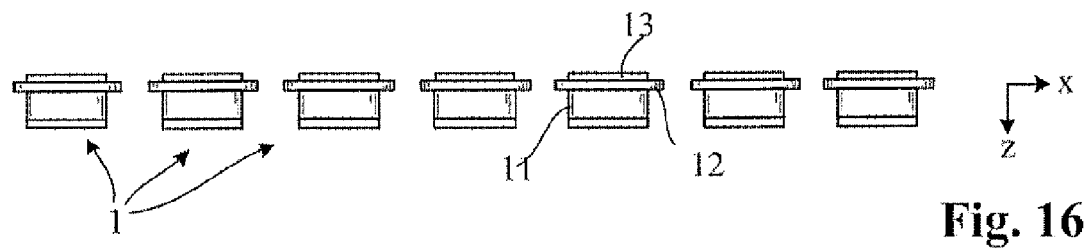

Then, the lens elements 13 are applied to the back face of the wafer, cf. FIG. 15. For details, cf. the explanations given in conjunction with FIG. 9.

Then, the so-obtained wafer of optical systems 1 is separated into a multitude of optical systems 1. For details, cf. the explanations given in conjunction with FIG. 10.

FIGS. 17 to 23 provide a cross-sectional illustration of a third wafer-level manufacturing method for manufacturing optical systems of FIG. 4. In this third method, the light guiding elements 13 are manufactured from a chunk of material before being applied to a wafer comprising a multitude of base plates 12. Alternatively, it is possible to manufacture the light guide elements 13 differently, e.g., using injection molding for producing single ones of them, or by creating single ones of them in glass, e.g., by glass molding.

Figure 17:
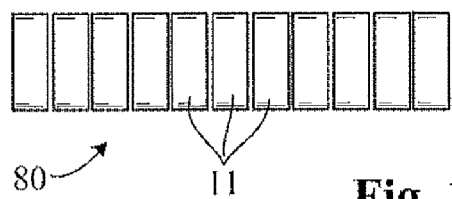
FIGS. 17 to 23 a cross-sectional illustration of a third wafer-level manufacturing method for manufacturing optical systems of FIG. 4.
Figure 18:
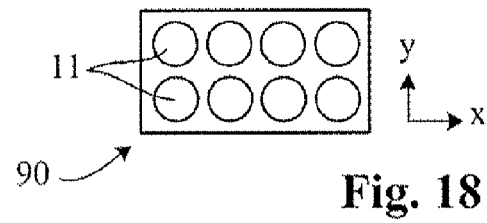

A first possibility to obtain light guiding elements 11 from a chunk of material is to obtain them from a rod 80 as illustrated in FIG. 17. Rod 80 is cut into a multitude of light guiding elements using, e.g., sawing or laser cutting, and possibly followed by a polishing step. FIG. 18 illustrates an alternative way of obtaining light guiding elements 11 from a chunk of material, namely by obtaining them from a plate or disk 90, e.g., by drilling using a hollow drill. It is possible to form a stack of plates or disks 90 and process these, e.g., by drilling, so as to save processing time and/or processing steps.

Figure 19:
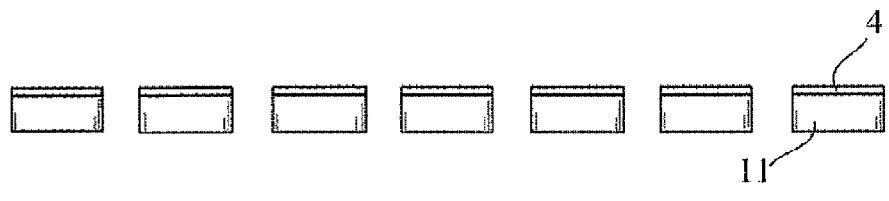

Then, a top coating 4 is applied to the light guiding elements, usually in a batch process coating a multitude of them in one process. The so-coated light guiding elements 11 are illustrated in FIG. 19. The coating 4 is, e.g., a scratch-protective and/or a smudge-protective coating.

Figure 20:
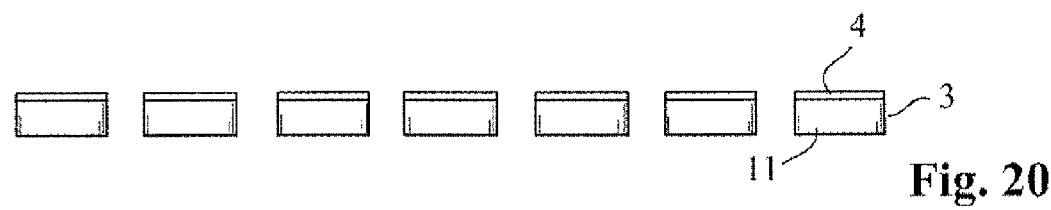

Then, a sidewall coating 3 is applied to the light guiding elements, usually in a batch process coating a multitude of them in one process. The so-coated light guiding elements 11 are illustrated in FIG. 20. The coating 3 is, e.g., a non-transparent coating.

It is also possible to interchange the order of application of the coatings 3 and 4. And it is also possible to skip one or both of these coatings.

In another process step, a wafer comprising a multitude of base plates 12 is provided, wherein that wafer may be obtained in an injection molding process, the mechanical guiding elements already being comprised. Alternatively, a wafer, e.g., a blank wafer, could be micromachined in order to produce a wafer comprising a multitude of base plates 12. And, as another alternative, this could be accomplished by cutting, e.g., die cutting, a wafer such as a blank wafer.

Figure 21:
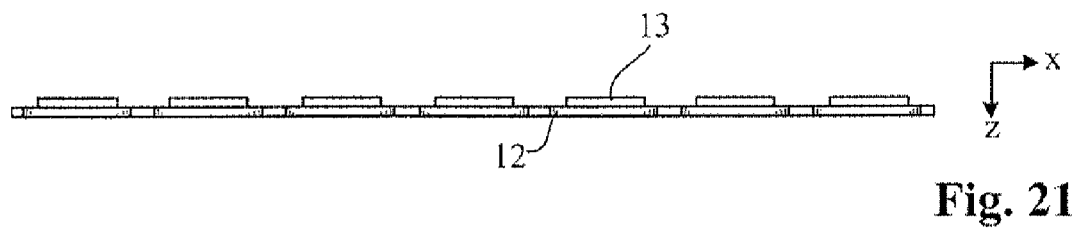

And then, that wafer is provided with lens elements 13, e.g., by replication, in particular by embossing. The so-obtained wafer is illustrated in FIG. 21. For details, cf. the explanations given in conjunction with FIG. 9. Note that it is possible to provide that, in the replication process, alignment marks are produced on the wafer, in particular at least one per lens element 13. Such alignment marks can be used in the following process step in which the light guiding elements 11 are attached:

On the opposite side of the wafer, the light guiding elements 11 are then applied, e.g., using a pick-and-place process. The light guiding elements 11 can be fixed to the wafer comprising the multitude of base plates 12, e.g., by gluing, e.g., using an epoxy resin. With alignment marks present on the wafer, the pick-and-place process can be carried out with extreme precision, since the alignment marks, e.g., one or two present for each light guiding element 11, can be very close to where the light guiding element 11 shall be placed, and because it can be provided that the position of the alignment mark is very precise with respect to the position of the respective lens element 13. The latter is readily achieved, e.g., when a replication tool for the production of the lens elements is manufactured using replication, and when a tool used during manufacturing of the replication tool comprises a negative or positive of both, the lens element and the accompanying one or more alignment marks.

It would also be possible to fix the light guiding elements 11 to the wafer of base plates 12 already before producing the lens elements 13.

Figure 22:
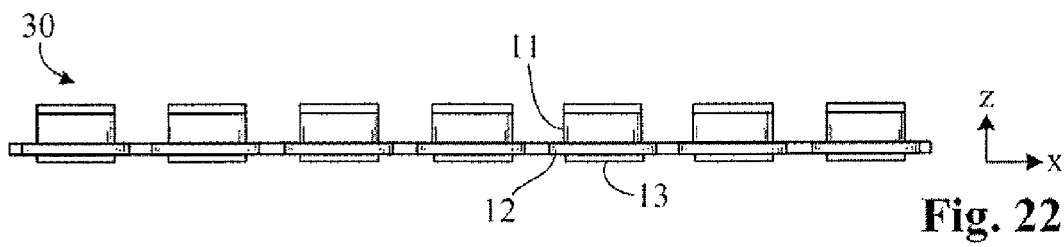
Figure 23:
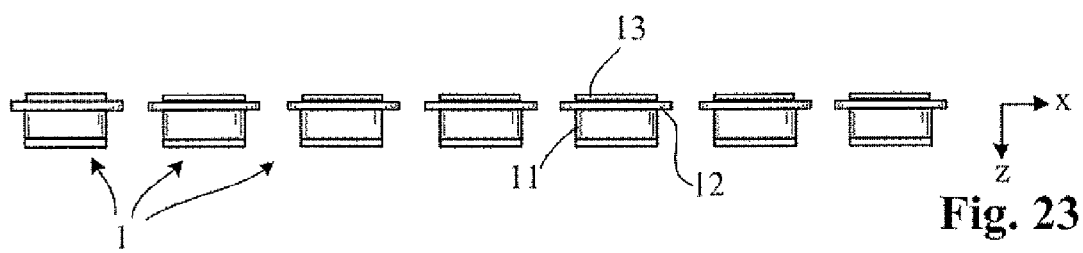

FIG. 22 shows wafer 30 of a multitude of optical systems before singulation.

Then, the so-obtained wafer of optical systems 1 is separated into a multitude of optical systems 1. For details, cf. the explanations given in conjunction with FIG. 10.

The described manufacturing methods make it possible to efficiently produce large numbers of optical systems 1 having a high precision and excellent optical properties.

Base plates 12 and light guiding elements can be substantially made of an injection-moldable polymer. Particularly suitable materials can be transparent polymers such as polycarbonate or Poly(methyl methacrylate), in short PMMA. In case of the third method (cf. FIGS. 17 to 23), also glass is a possible choice for the light guiding elements 11. The lens elements 13 can be made substantially of a replication material such as a cured curable material, e.g., a UV-curable or a heat-curable polymer.

Built-in in an electronic device 50, cf. FIG. 1, the described optical systems 1 not only are of high precision and of excellent optical properties, but also positionable in electronic device 50 in high precision, due to the integrated manufacture of mechanical guiding elements 5. And, the amount of space taken by an optical system 1 in an electronic device 50 is extremely small. Using the described methods, high-volume mass production is possible.

It is furthermore to be noted that the assembly of the opto-electronic module 40 (cf. FIG. 1) may be carried out on wafer-scale. A wafer or wafer stack comprising a multitude of casing portions 25 and a multitude of active optical components 20 and a multitude of mechanical guiding elements 55 can be manufactured. Then, a wafer stack can be formed of that wafer or wafer stack plus the wafer 30 comprising the multitude of optical systems 1 (cf. FIGS. 3, 9, 15, 22). Singulating the so-obtained wafer stack yields a multitude of opto-electronic modules 40 in high precision, with high yield and high throughput in the manufacturing process.

The invention claimed is:

1. An electronic device operable to produce illumination the electronic device comprising;
    an optical system comprising:
        a base plate having a first plate side and a second plate side, said base plate comprising at least one mechanical guiding element, and
        a light guide element located substantially on said first plate side and a lens element located on said second plate side,
        wherein said base plate and said light guide element are integrally formed or are distinct parts, wherein said base plate is at least partially transparent, and wherein the optical system forms, for illumination from the electronic device, a light path for light passing through said lens element across said base plate and through said light guide element,
    the electronic device further comprising a housing, said housing comprising:
        an opening in which at least a portion of said light guide element is arranged wherein the light guide element constitutes a further mechanical guiding element for the housing; and
        at least one mechanical guiding element structured and arranged for cooperating with said at least one mechanical guiding element of said base plate.

2. The electronic device according to claim 1, wherein said light guide element has an axis described by its shape and said lens element has an axis described by its shape, and wherein these axes are coinciding and are aligned perpendicular to said base plate.

3. The electronic device according to claim 1, wherein said base plate is
    substantially made of a transparent material; or
    comprises a first portion of a non-transparent material and a second portion of a transparent material.

4. The electronic device according to claim 1, wherein said at least one mechanical guiding element of the base plate comprises at least one of
    a protrusion protruding from said base plate;
    a recess in said base plate; or
    an edge.

5. The electronic device according to claim 1, said base plate comprising at least one mechanical guiding element arranged on said first plate side and at least one mechanical guiding element arranged on said second plate side.

6. The electronic device according to claim 1, wherein said lens element is at least one of:
    manufactured using replication; or
    made of a hardened hardenable material.

7. The electronic device according to claim 1, wherein said light guide element is of substantially prismatic shape.

8. The electronic device according to claim 1, wherein said light guide element comprises at least one side wall on which a coating is applied.

9. The electronic device according to claim 8, wherein said coating is a non-transparent coating.

10. The electronic device according to claim 8, wherein said coating is at least one of:
    a scratch-resistant coating; or
    an anti-smudge coating.

11. The electronic device according to claim 1, wherein said light guide element comprises, at an end distal from said base plate, a top wall, said top wall being substantially flat and aligned substantially parallel to said base plate.

12. The electronic device according to claim 1, wherein said base plate laterally exceeds said light guide element and said lens element in at least two directions.

13. The electronic device according to claim 1 wherein the optical system forms part of an opto-electronic module that further includes at least one active optical component.

14. The electronic device according to claim 13, wherein said at least one active optical component comprises at least one light emitting element.

15. The electronic device according to claim 13, wherein the opto-electronic module comprises a casing portion to which said at least one active optical component is attached, wherein said casing portion is attached to said base plate.

16. The electronic device according to claim 15, wherein said casing portion is at least one of:
    attached to said second plate side; or
    aligned with respect to said base plate using one or more or said at least one mechanical guiding elements of said base plate.

17. The electronic device according to claim 1, which is a hand-held communication device or a photographic device.

18. An appliance comprising a multitude of optical systems as recited in claim 1, the optical systems arranged with their respective base plates substantially in a common plane.

19. The electronic device according to claim 1, wherein said light guide element comprises at least one side wall and, at an end distal from said base plate, a top wall.

20. The electronic device according to claim 1, which is a hand-held communication device or a photographic device.

21. The electronic device according to claim 1, wherein said light guide element is of substantially cylindrical shape.

22. A method for manufacturing an electronic devices operable to produce illumination as recited in claim 1, said method comprising:
    providing a wafer comprising a multitude of base plates, each of which has a first plate side and a second plate side, a light guide element located substantially on the first plate side and a lens element located on the second plate side, each of said base plates comprising at least one mechanical guiding element;
    assembling a multitude of said light guide elements on said wafer;
    separating the wafer into a multitude of individual optical systems, each of which includes at least one of the light guide elements on a respective one of the base plates; and
    attaching a housing to a respective one of the optical systems, wherein the housing comprises at least one mechanical guiding element structured and arranged for cooperating with said at least one mechanical guiding element of the base plate; and the housing further comprising an opening into which at least a portion of said light guide element is disposed wherein the light guide element serves as a further mechanical guiding element for the housing.

23. The method according to claim 22, comprising manufacturing said lens element using replication.

24. The method according to claim 22, wherein said wafer comprises at least one first alignment mark, said method comprising replicating lens elements on said wafer using a replication tool comprising at least one second alignment mark, said method further comprising an alignment step in which said at least one first alignment mark is aligned with respect to said at least one second alignment mark.

25. The method according to claim 22, wherein said wafer comprises a multitude of said optical systems.

26. The method according to claim 22, comprising applying to side walls of said light guide element a coating.

27. The method according to claim 22, comprising jointly manufacturing said wafer and said light guide element using the same type of process.

28. The method according to claim 22, comprising manufacturing said light guide element using a micro-machining process.

29. The method according to claim 28, wherein said micro-machining process is applied to a blank wafer.

30. The method according to claim 29, comprising applying a thinning process for thinning the material of said blank wafer after having conducted said micro-machining process.

31. The method according to claim 22, comprising manufacturing said wafer using an injection molding process.

32. The method according to claim 31, comprising providing a top wall of said light guide element which is substantially flat and aligned substantially parallel to said wafer with a coating.

33. The method according to claim 31, comprising applying a thinning process for thinning the injection-molded material.

34. The method according to claim 22, including manufacturing said multitude of said light guide elements wherein manufacturing said multitude of said light guide elements comprises obtaining said multitude of said light guide elements by cutting at least one rod into parts.

35. The method according to claim 34, comprising providing said multitude of said light guide elements with at least one coating.

36. The method according to claim 22, including manufacturing said multitude of said light guide elements, wherein manufacturing said multitude of said light guide elements comprises obtaining said multitude of said light guide elements by cutting at least one plate or disk into parts.

37. The method according to claim 36, wherein said plate or disk comprises a top wall comprising a coating.

* * * * *